April 28, 1964　　C. O. BERGLUND ETAL　　3,131,335
LIQUID LEVEL CONTROLLER

Filed Nov. 10, 1960　　　　　　　　　　　　　2 Sheets-Sheet 1

INVENTORS
CARL O. BERGLUND &
ROY R. THOMPSON
BY
*Jerry J. Dunlap*
ATTORNEY

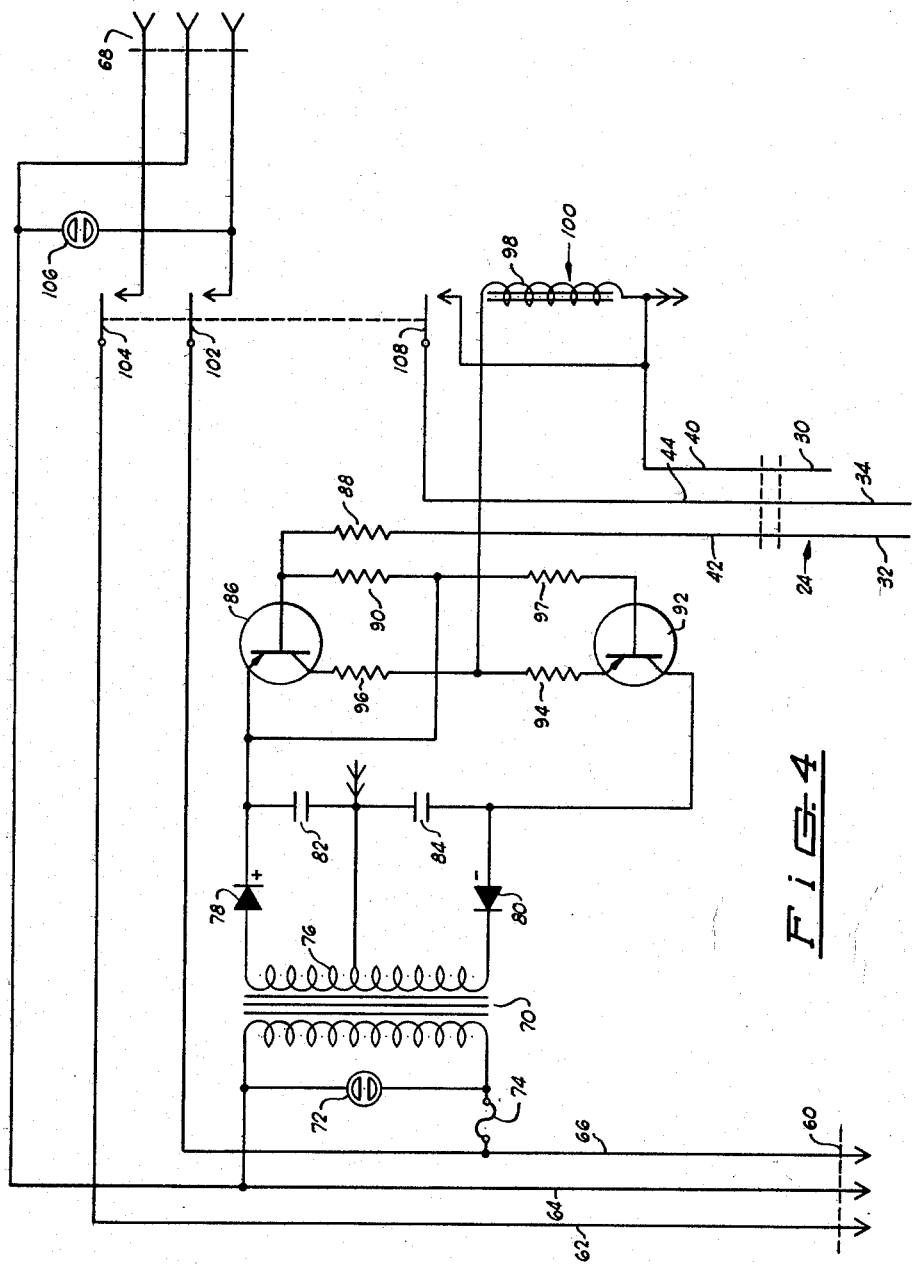

United States Patent Office

3,131,335
Patented Apr. 28, 1964

3,131,335
LIQUID LEVEL CONTROLLER
Carl O. Berglund, 4411 San Jacinto, and Roy R. Thompson, 527 Meadows Bldg., both of Dallas, Tex.
Filed Nov. 10, 1960, Ser. No. 68,443
5 Claims. (Cl. 317—148.5)

This invention relates generally, as indicated, to improvements in liquid level controllers and, more particularly, to an electrically-operated liquid level controller for controlling the level of an electroyte.

As it is well known in the art, it is frequently desirable to automatically regulate the level of liquid in a tank or other suitable vessel and maintain the level of the liquid between predetermined upper and lower levels. For example, all of the liquids from one or more producing oil wells are normally directed into a surge or stock tank on a producing oil lease. These liquids normally comprise both oil and water, and the water tends to settle out in the lower portion of any tank in which the liquids are directed or stored. The primary purpose in directing all of these liquids into a tank on the lease is to remove the free water from the oil simply by a settling action in the tank. The water can be simply drained from the tank periodically to maintain the maximum capacity in the tank for incoming oil and water. It will be apparent that if this water can be drained from such a tank automatically when the water reaches a predetermined upper level, substantial savings of time and effort in the operation of the lease can be made.

At the present time there are basically three different types of liquid level control systems which may be used to control the level of an electrolyte, such as water. The most popular type requires the use of vertically-spaced floats in a tank located at predetermined upper and lower levels which are physically operated as the level of the liquid reaches the respective floats. However, in the environment described above, a layer of oil is disposed on top of the water and the height of the oil in the tank is no indication of the height of the water in the tank, such that a float-type liquid level control system is impractical. Furthermore, such floats are frequently corroded and otherwise damaged in normal operations and require relatively frequent repair.

A second type of presently available liquid level control system utilizes a pressure-operated switch connected to a tank and exposed to the hydrostatic head of liquid in the tank. Here again, a layer of oil on top of water in an environment of the type described above adds to the hydrostatic head imposed on such a pressure-operated switch and makes the system impractical for this type of operation. Furthermore, pressure-type switches are particularly difficult to protect from corrosive liquids and are normally easily clogged and rendered inoperative by the deposition of foreign matter in the switch housing against the diaphragm used for translating the hydrostatic head to operation of the switch.

To the best of our knowledge and belief, no practical, completely electrical system has heretofore been available for automatically draining an electrolyte from a tank when the electrolyte reaches a predetermined level and then stopping the drainage of the electrolyte from the tank when the electrolyte reaches a predetermined lower level, particularly in explosive environments. Prior completely electrical control systems have required an excessive continuous supply of power, have required a complicated supporting system for contacts in the tank, have been subject to erratic action after an extended period of use, have been subject to erratic operation by reason of excessive environmental temperatures, and/or have been complicated, expensive and difficult to maintain.

An important object of this invention is to automatically control the level of an electrolyte between predetermined upper and lower levels in a vessel, even though a layer of another liquid of unknown height may be present on top of the electrolyte being controlled.

Another object of this invention is to provide a novel probe for accurately sensing the levels of an electrolyte in a vessel which will not become shorted-out by the deposition of foreign matter thereon in a normal operation of a liquid level control system.

A further object of this invention is to provide a novel support for a probe in an electrical liquid level control system.

Another object of this invention is to provide an electrical liquid level control system which is insensitive to excessive environmental temperatures and which may be used in explosive environments.

A still further object of this invention is to provide an electrical liquid level control system which is simple in construction, may be economically manufactured, and will have a long and trouble-free service life.

Other objects and advantages of the invention will be evident from the following detailed description, when read in conjunction with the accompanying drawings which illustrate our invention.

In the drawings:

FIGURE 4 is a schematic wiring diagram of the control portion of a liquid level control system constructed in accordance with this invention.

Figure 1:
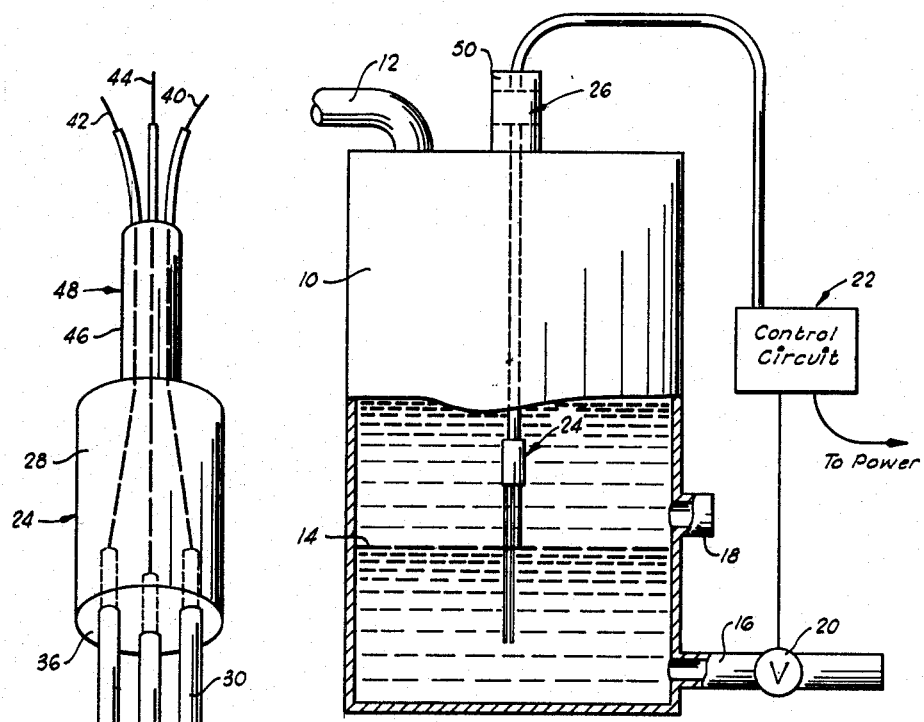
FIGURE 1 is a schematic elevational view of a typical oil field stock tank having our novel system incorporated therein, with a portion of the tank broken away to illustrate the complete system.

Referring to the drawings in detail, and particularly FIG. 1, reference character 10 designates a vessel such as a stock or surge tank located on a producing oil lease. In a typical environment, oil and salt water are fed to the tank 10 through the inlet 12 and tend to stratify in the tank 10 with the salt water gravitating to the lower portion of the tank. In a normal operation, a fairly distinct interface 14 will be formed between the oil and salt water in the tank. An outlet 16 is provided at the bottom of the tank 10 to drain salt water from the tank, and an outlet 18 is provided in the side of the tank slightly above the preferred level of the interface 14 for draining oil from the tank for further processing.

On most oil leases the total and relative amounts of oil and salt water fed into the tank 10 will vary from hour-to-hour and day-to-day. Therefore, the level of the salt water should not be allowed to rise above the preferred level 14 to be exposed to the oil outlet 18, and the level of the salt water should not be permitted to fall below the level of the salt water outlet 16 in order to prevent oil from being exposed to this outlet 16. The control of the level of the salt water is normally controlled either manually by the operator of the lease observing a gauge glass (not shown) mounted on the side of the tank 10 and periodically opening the outlet 16, or by means of a siphoning device which, as it is well known in the art, frequently does not operate in the proper manner.

In accordance with the present invention, a solenoid valve 20 is interposed in the salt water outlet 16 and is opened and closed by a control circuit designated generally by reference character 22. The control circuit 22 is responsive to the contact of the salt water in the tank 10 with a probe 24 suspended in the tank by a supporting device 26.

Figures 2, 3:
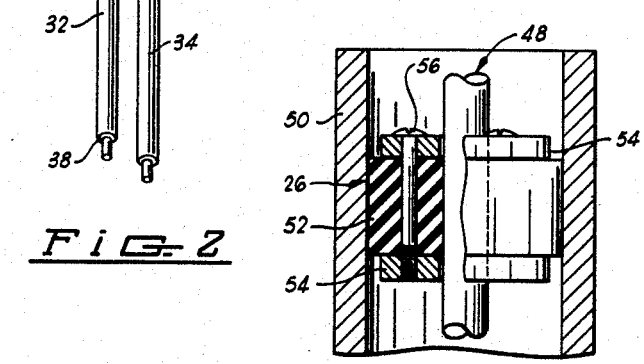
FIGURE 2 is an enlarged elevational view of a probe of an electrical liquid level control system constructed in accordance with this invention.
FIGURE 3 is an enlarged elevational view of a probe support, with portions of the support shown in section to illustrate details of construction.

The probe 24 (FIG. 2) comprises a cylindrically-shaped body 28 of insulating material of any suitable type, such as a phenolic plastic, having three conductor rods 30, 32 and 34 depending from one end face 36 thereof. The rods 30, 32 and 34 are preferably formed of stainless steel and are suitably imbedded in the body 28 to rigidly secure the rods to the body in parallel relation, as illustrated in FIG. 2. It will also be noted that the rod 30 is the shorter of the three rods, while the rods 32 and 34 are of substantially equal lengths. As will be explained in detail below, the rods 30, 32 and 34 are the sensing elements controlling operation of the control circuit 22 and are therefore frequently at least partially immersed in the salt water being controlled. In order to minimize the possibility of forming a short circuit between any of the rods 30, 32 and 34 by the deposition of conductive substances thereon and across the face 36 of the body 28 from the water and/or oil in the tank 10, we prefer to coat each of the rods with a suitable insulating coating 38, such as epoxy resin, from the end face 36 of the body 28 to adjacent the respective free end of the rod. The free end of each of the rods 30, 32 and 34 therefore forms a contact area a precise distance from the body 28.

Three conductors 40, 42 and 44 are connected to the respective rods 30, 32 and 34 and extend through the body 28 to the control circuit 22, as will be described. Also, a suitable insulating cover 46 is formed around the conductors 40, 42 and 44 from the body 28 to the control circuit 22 to form what is commonly known as a three-conductor cable which has been generally designated by reference character 48.

As previously indicated, the probe 24 is suspended in the tank 10, and this is accomplished by means of the supporting device 26 engaging the three-conductor cable 48, as illustrated in FIG. 3. A coupling 50 is normally provided in the top of the tank 10 and, if it is not so provided, it can be easily installed to receive the supporting device 26. The supporting device 26 comprises a tubular body 52 of elastic material, such as neoprene, having a normal inner diameter of a size to slidingly receive the three-conductor cable 48 and having an outer diameter of a size to slidingly fit in the coupling 50. Metal washers 54, such as brass, are positioned on the upper and lower faces of the elastic body 52 around the cable 48 and are interconnected by circumferentially-spaced screws 56 extending through the length of the body 52.

When the probe 24 has been lowered to the desired height in the tank 10 (with the upper conductor rod 30 terminating at substantially the desired level of the interface 14), the screws 56 are tightened to draw the washers 54 toward one another and compress the elastic body 52. The body 52 will therefore be compressed tightly in contact with the inner periphery of the coupling 50 and tightly in contact with the outer periphery of the cable 48 to provide an adequate support for the cable 48 and the probe 24. It will also be noted that the supporting device 26 then forms a fluid-tight plug in the coupling 50 to prevent the ingress of foreign matter into the top of the tank 10 through the coupling.

In a commercial embodiment of the control circuit 22, as illustrated in FIG. 4, we provide a three-prong male connector 60 on one set of ends of three-conductors 62, 64 and 66 for connection of the conductors to a suitable source of single-phase power supply which is normally available at an oil-producing lease. A female connector 68 is provided on the opposite set of ends of the conductors 62, 64 and 66 to facilitate the connection of the control circuit to the solenoid valve 20 for control of the valve in response to the control circuit.

Power for the circuit 22 is obtained by means of a transformer 70 connected across the conductors 64 and 66. Also, an indicating lamp 72 is preferably connected across the primary of the transformer 70 to provide a visual indication when the power is supplied to the control circuit. A suitable fuse 74 may be connected in the primary circuit of the transformer 70 for protection against power fluctuations.

The secondary 76 of the transformer 70 is center-tapped. Diodes 78 and 80 are connected to the opposite ends of the transformer secondary 76 in opposing relation to rectify the output of the transformer 70, with the diode 78 passing only a positive D.C. current and the diode 80 passing only a negative D.C. current. Capacitors 82 and 84 are connected to the diodes 78 and 80 and to the center-tap to filter out any A.C. current which may pass through the diodes.

The positive D.C. current passing through the diode 78 is applied to the emitter of a PNP-type transistor 86, such as a 2N456 germanium transistor manufactured by the Texas Instrument Company, of Dallas, Texas. The base of the transistor 86 is connected through a suitable resistor 88 to the conductor 42 leading to the rod 32 of the probe 24 to control the operation of the transistor 86, as will be described below. Also, the base of the transistor 86 is connected to the emitter through a suitable resistor 90 to minimize the conduction of $I_{eco}$ currents through the transistor 86 at lower temperature ranges. As is known in the transistor art, a PNP-type transistor is normally conductive only when a negative bias is applied to the base of the transistor. However, heating of the transistor, either internally or externally, produces an $I_{eco}$ current from the emitter to the collector; and such $I_{eco}$ current is non-linear. In the lower temperature ranges of the PNP-type transistor 86, the shunt between the emitter and the base retains a positive bias on the base of the transistor and reduces this $I_{eco}$ current to a nominal value. However, this shunt will not prohibit the $I_{eco}$ current at higher temperature ranges, such as in excess of 110° F. In order to control the $I_{eco}$ current through the transistor 86 in the higher temperature ranges, we provide a second, identical transistor 92 connected to the transistor 86 in opposing relation.

The collector of the transistor 92 is connected to the diode 80 to receive a negative bias, and the emitter of the transistor 92 is connected to the collector of the transistor 86 through suitable resistors 94 and 96. The base of the transistor 92 is connected to the base of the transistor 86 through a suitable resistor 97 and the resistor 90 previously described. Thus, the base of the transistor 92 is normally provided with a positive bias from the emitter of the transistor 86 (in the same manner as the base of the transistor 86) to minimize $I_{eco}$ currents through the transistor 92 in the lower temperature ranges.

At higher temperatures, the $I_{eco}$ current through the transistor 92 will be equal and opposite to the $I_{eco}$ current through the transistor 86 and will effectively balance or null out the $I_{eco}$ current through the transistor 86 when the same positive bias is applied to the bases of both of these transistors. As a result, the transistor 86 will be responsive to negative bias applied to the base thereof from the rod 32 of the probe 24, regardless of the operating temperature of the circuit. When the base of the transistor 86 is made negative, a positive D.C. current is passed through the transistor 86 from the emitter to the collector and through the resistor 96.

The positive D.C. current passed through the transistor 86 in response to a negative bias on the base thereof is applied to one end of the coil 98 of a normally open, three-pole relay 100. The opposite end of the coil 98 is connected to the center-tap of the transformer 70 (as indicated by the arrows) and to the conductor 40 leading to the rod 30 of the probe 24. Thus, when the contact areas of both of the rods 30 and 32 are immersed in a common electrolyte, such as the salt water standing in the tank 10, a negative D.C. bias is applied to the base of the transistor 86 through the rod 32, conductor 42 and resistor 88; whereby current passes through the transistor 86 and the relay coil 98 for energizing the relay 100. Two of the switches 102 and 104 of the relay 100 are interposed in the conductors 62 and 66 leading to the solenoid valve 20, such that power will be supplied to the solenoid valve 20 when the relay is closed. It may also be noted that an indicating lamp 106 is preferably connected across the conductors 64 and 66 between the switch 104 and the female connector 68 to visually indicate when power is being supplied to the solenoid valve 20. When such power is supplied to the solenoid valve, the valve will open to start the draining of salt water from the tank 10.

The third switch 108 of the relay 100 is connected across the conductor 40 leading from the rod 30 and the conductor 44 leading from the rod 34. Therefore, when the relay 100 closes, the relay will be locked-in, even as the level of the salt water drops below the contact area of the rod 30. However, when the level of the salt water drops below the contact areas of both the rods 32 and 34, no negative bias will be supplied to the transistor 86 and the relay 100 will open to cut off the power supply to the solenoid valve 20; whereupon the solenoid valve 20 will again close to assure that none of the oil standing in the tank 10 will be drained through the salt water outlet 16.

In summarizing the operation of the present system, it will be apparent that the probe 24 is suspended in the tank 10 at such a level that the contact area of the shorter rod 30 is located at the desired level of the interface 14 between the oil and salt water. The contact areas of the rods 32 and 34 will therefore be located at a lower level in the tank 10, and these rods may be of any desired length to control the depth of the salt water in the tank. It should be noted, however, that the contact areas of the rods 32 and 34 should be appreciably above the level of the salt water outlet 16 to assure that no oil will be drained from the tank 10 through the outlet 16.

When the level of the salt water is below the rods 32 and 34 of the probe 24, the $I_{eco}$ currents through the transistor 86 will be minimized and effectively nulled by the transistor 92, in combination with the shunt between the emitter and base of the transistor 86. As a result, no current will be supplied to the relay 100 and no current will be supplied to the solenoid valve 20, such that the salt water outlet 16 will be closed.

When the level of the salt water rises to such a point that the contact areas of the probe 24 are immersed in the salt water, a negative bias is applied to the base of the transistor 86, such that current will be supplied through the transistor 86 to the coil of the relay 100 and close the relay. Power will then be supplied through the conductors 62, 64 and 66 to the solenoid valve 20 to open the valve and start the drainage of salt water through the outlet 16. The relay 100 is held in by virtue of the connection of the contact areas of the probe rods 32 and 34 and a short-circuiting of current through the relay switch 108 while the level of the salt water is being lowered from the height of the rod 30 to the heights of the rods 32 and 34. When the level of the salt water drops below the contact areas of the rods 32 and 34, the negative bias on the base of the transistor 86 is removed and the relay 100 is deenergized to cut off the power supply to the solenoid valve 20.

From the foregoing it will be apparent that the present invention provides a novel system for automatically controlling the level of an electrolyte between predetermined upper and lower levels. The system is particularly useful in an environment where a non-electrolytic liquid is superimposed on the electrolyte being controlled, such as in a stock tank at an oil lease where oil is superimposed on salt water. The control circuit of the system may be easily housed in a suitable box which can be easily mounted alongside the vessel or tank containing the electrolyte being controlled, and the system is easily installed. The probe is simply lowered to the desired height in the tank and is locked in the desired position by means of the simple fastening device which fits in most existing tank installations. When the control circuit is then plugged into a suitable source of power and to the solenoid valve, the system is ready for operation. It will further be apparent that the control circuit is unaffected by temperature conditions and it is not necessary to go to substantial expense to maintain the components of the circuit at any predetermined temperature. Another important feature of this invention is the small potentials and currents employed in the portion of the control circuit exposed to the liquid or liquids being controlled, yet the system may be used with an electrolyte having an extremely high resistance. In a typical embodiment, six volts potential is applied between the rods of the probe when the probe is not immersed in the electrolyte. When the probe is immersed in the electrolyte, the potential between the probe rods drops to an insignificant value and approximately one milliampere flows through the electrolyte. Finally, it will be apparent that the present system is simple in construction, may be economically manufactured and will have a long service life.

Changes may be made in the combination and arrangement of parts or elements as heretofore set forth in the specification and shown in the drawings, it being understood that changes may be made in the precise embodiment disclosed without departing from the spirit and scope of the invention as defined in the following claims.

We claim:

1. A system for opening and closing the switch of a relay in response to variations between a predetermined upper level and a predetermined lower level of an electrolyte temporarily stored in a vessel, comprising: a first contact supported in the vessel at said predetermined upper level and connected to one end of the coil of the relay, a PNP-type transistor having its collector connected to the opposite end of said relay coil, means for supplying a positive D.C. current to the emitter of said transistor, a second contact supported in the vessel at said predetermined lower level and connected to the base of said transistor for placing a negative bias on said base and rendering said transistor conductive when both of said first and second contacts are immersed in the electrolyte to in turn close said relay, a third contact supported in the vessel at said predetermined lower level and connected to a switch of said relay for locking in said relay as long as the level of the electrolyte is above said predetermined lower level, and means for nulling the $I_{eco}$ current through said transistor.

2. The system defined in claim 1 wherein the last-mentioned means includes a shunt between the emitter and base of said transistor and means for biasing the collector of said transistor with current of equal and opposite polarity to said $I_{eco}$.

3. The system defined in claim 2 wherein the last-mentioned means comprises a second transistor having the same characteristics as the first-mentioned transistor, said second transistor having its emitter connected to the collector of the first-mentioned transistor and having its base connected to the base of the first-mentioned transistor, and means supplying a negative D.C. current to the collector of said second transistor equal in magnitude to the positive D.C. current supplied to the emitter of the first-mentioned transistor.

4. The system defined in claim 3 wherein said means for supplying said positive and negative D.C. currents to said transistors comprises a transformer connected to said supply and having a center-tapped secondary, a first diode connected to one side of said secondary and to the emitter of the first-mentioned transistor, a second diode connected to the opposite side of said secondary and to the collector of said second transistor, said second diode being arranged oppositely to the first diode, and capacitors connecting said diodes to the center of said secondary to filter out any A.C. current which may pass said diodes.

5. The system defined in claim 1 wherein said contacts are formed on a probe having conductors extending therefrom through an insulating covering, said vessel has a coupling in the upper end thereof and characterized further to include means for suspending the probe in the vessel comprising a cylindrical block of elastic material of a size to slidingly fit in said coupling in an uncompressed state and having a bore extending longitudinally therethrough slidingly receiving said conductors and insulating covering, washers telescoped on said conductors against the opposite ends of said block, and screws extending through said block in circumferentially-spaced relation into connection with said washers for moving said washers toward one another and compressing said block against the inner periphery of said coupling and against the outer periphery of said covering around said conductors.

References Cited in the file of this patent

UNITED STATES PATENTS

| | | |
|---|---|---|
| 2,051,180 | Ruzicka | Aug. 18, 1936 |
| 2,394,220 | Wagner | Feb. 5, 1946 |
| 2,539,206 | Robinson | Oct. 27, 1948 |
| 2,925,101 | Dunham | Feb. 16, 1960 |
| 2,965,126 | Hallman | Dec. 20, 1960 |